June 29, 1954  L. F. MILLER  2,682,091
ROLL-OVER MOLDING MACHINE
Filed June 11, 1949  3 Sheets-Sheet 2

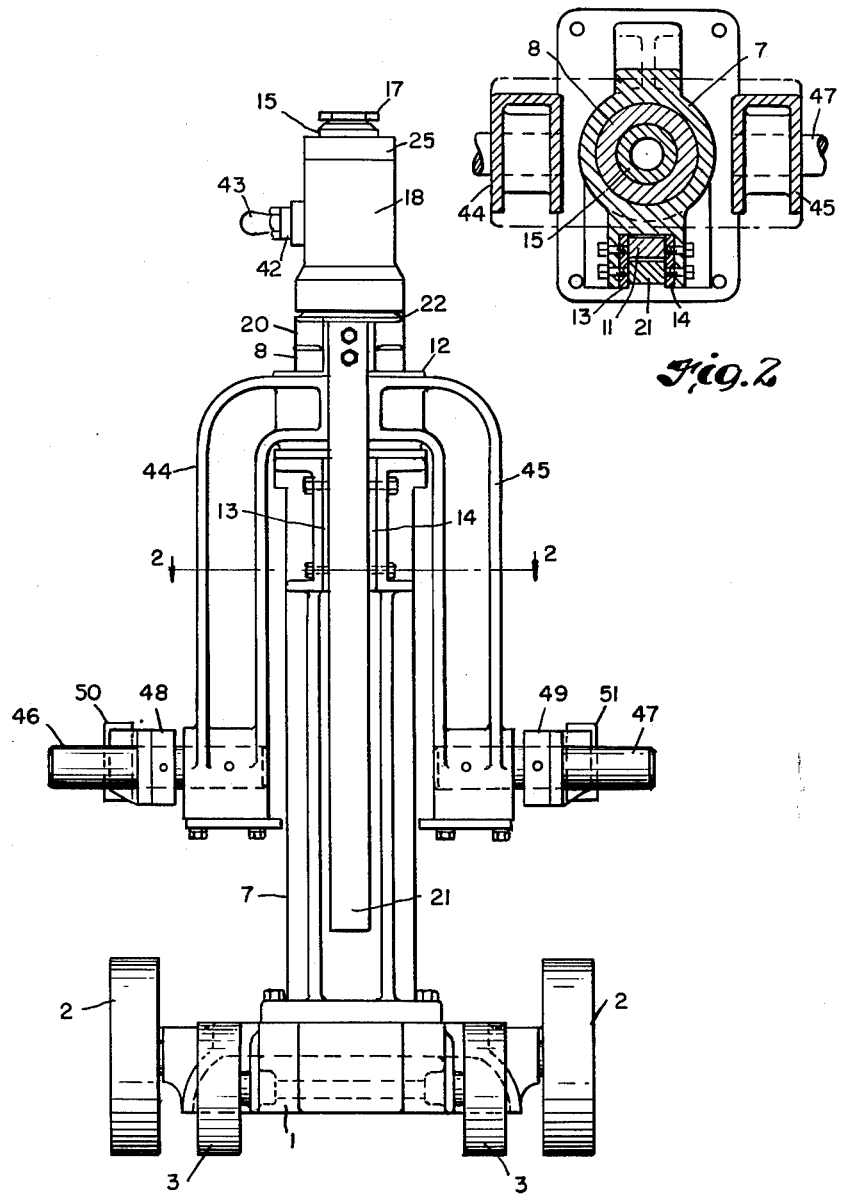

INVENTOR.
LEON F. MILLER
BY
Oberlin & Limbach
ATTORNEYS.

June 29, 1954 L. F. MILLER 2,682,091
ROLL-OVER MOLDING MACHINE
Filed June 11, 1949 3 Sheets-Sheet 3

INVENTOR.
LEON F. MILLER
BY Oberlin & Limbach
ATTORNEYS.

Patented June 29, 1954

2,682,091

UNITED STATES PATENT OFFICE 2,682,091

ROLL-OVER MOLDING MACHINE

Leon F. Miller, Fairview Park, Ohio, assignor to The Osborn Manufacturing Company, Cleveland, Ohio, a corporation of Ohio Application June 11, 1949, Serial No. 98,588

9 Claims. (Cl. 22—32)

This invention relates as indicated to molding machines and more particularly to molding machines employing a jolt table and adapted to handle quite large size molds.

Patent No. 2,012,478 to Earl F. Oyster et al. discloses a mold-making machine of the squeeze type provided with a pair of vertical roll-over standards upwardly movable to engage trunnions on the flask assembly whereby the latter may be elevated and then easily rolled over by hand. The Oyster machine has proven very satisfactory in use, and my new machine resembles the same in certain particulars while incorporating various changes and improvements for the purpose of handling a somewhat different type of work. It is a primary object of my invention to provide a molding machine adapted to handle relatively large size molds with a considerable increase in speed of operation.

Another object of my invention is to provide such machine which will be of relatively compact construction and adapted either to be positioned in one place or to move along the molding floor as desired.

Still another object is to provide such machine by which the cope may be drawn upwardly instead of drawing the mold downwardly as shown and described in the aforesaid Oyster patent.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a rear elevational view of one embodiment of my new molding machine, the jolt table being omitted from such figure in the interest of clarity;

Fig. 2 is a horizontal sectional view taken along the line 2—2 on Fig. 1;

Figure 3:
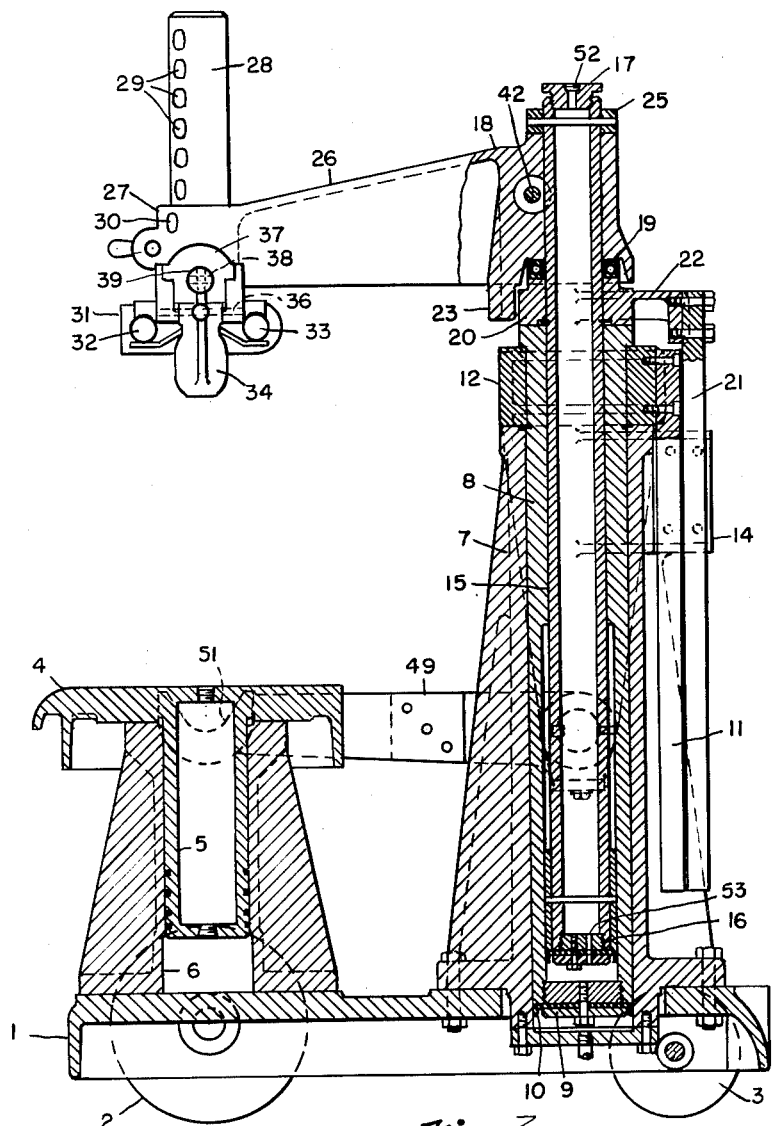
Fig. 3 is a vertical sectional view of the machine.

Referring now more particularly to said drawing, my new machine comprises a base 1 which may either rest upon a suitable foundation or be mounted on rollers 2 and 3 to permit the machine to be moved along the molding floor, taking molding sand from a continuous windrow and leaving a line of completed molds ready for pouring.

A conventional jolt table 4 is adapted to be vertically reciprocated by means of piston 5 in cylinder 6 in the usual manner to compact the sand within a mold flask resting thereon.

To the rear of such table a vertical cylindrical column or standard 7 is rigidly bolted to base or carriage 1. A vertically reciprocable tubular piston 8 is fitted within such cylinder and closed at its lower end by piston head 9 provided with seal 10. A rectangular bar 11 depends from sleeve 12 fixed to the upper end of piston 8 and is closely laterally embraced by a pair of vertically disposed guide plates 13 and 14 mounted on cylinder 7. Consequently, piston 8 is unable to turn within such cylinder whether in retracted or extended position.

A second piston 15 is fitted within outer piston 8 and provided with piston head 16 at its lower end. It will now be apparent that upon admission of fluid pressure to the lower end of cylinder 7 outer piston 8 will be caused to rise, carrying inner piston 15 therewith. The upper end of inner piston 15 is closed with a plug 17. A draw head 18 is pivotally mounted on the upper end portion of piston 15 and rests upon thrust bearing 19 carried by collar 20 fixed to such inner piston. A vertically depending guide bar 21 carried by bracket 22 on collar 20 secured to inner piston 15 is laterally confined by guide plates 13 and 14 similarly to guide bar 11 and similarly prevents rotation of piston 15.

Figure 4:
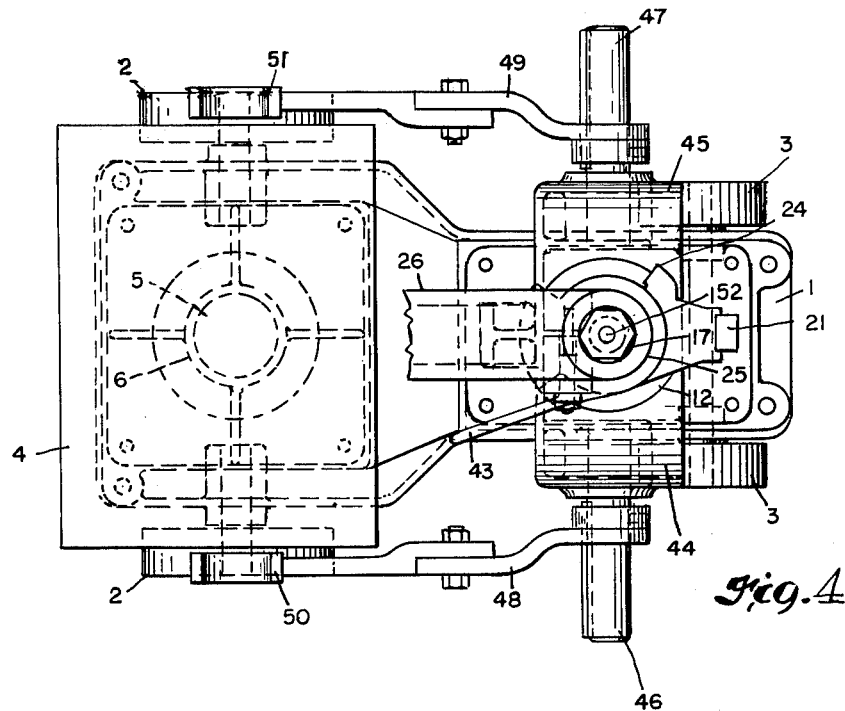
Fig. 4 is a top plan view with the draw head broken away better to show the jolt table and mold lifting cradles.
Figure 5:
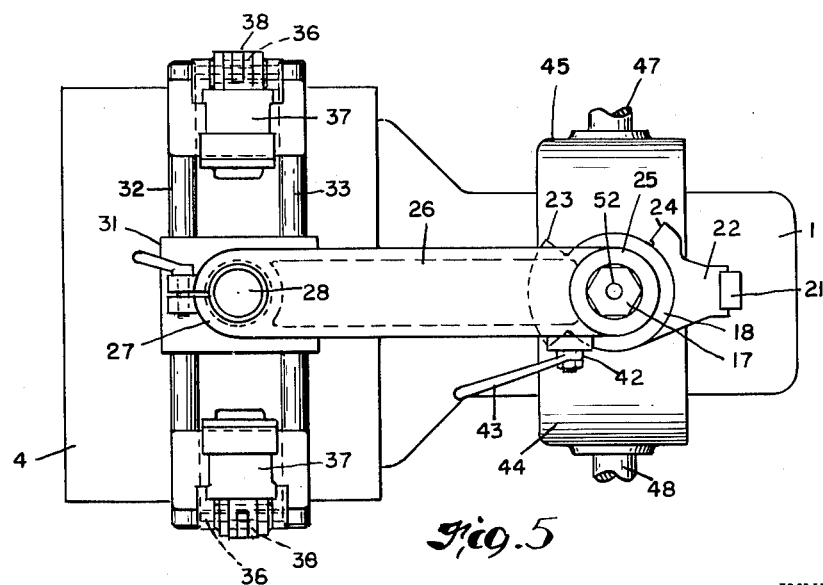
Fig. 5 is a top plan view of such draw head with the base of the machine shown in outline only.

Draw head 18 includes a lug 23 adapted to engage a stop 24 on collar 20 limiting the degree to which such draw head may be swung in a clockwise direction as viewed in Figs. 4 and 5. A collar 25 is pinned to the upper end of piston 15, securing such draw head thereon. Arm 26 of such draw head is adapted to extend over jolt table 4 and terminates in a vertical clamping collar 27. Bar 28 is adapted to be gripped in such collar and is provided with a series of holes 29 therethrough corresponding with hole 30 in collar 27 in which a pin may be inserted as an additional precaution to supplement the clamping action of the collar. The position of bar 28 will be adjusted depending on the size of mold flask to be handled.

Figure 6:
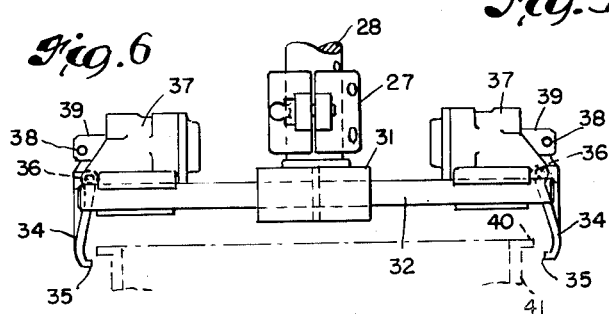
Fig. 6 is a front elevational view of the draw head.

Carried in a bracket 31 secured to the lower end of bar 28 are two parallel rods 32 and 33 supporting cooperating clamping means at their respective ends. Such clamping means comprise curved clamping fingers 34 terminating in hooked ends 35 and pivotally mounted at 36. Fluid pressure actuated piston cylinder assemblies 37 are operative to rock such fingers through pivotal connections 38 with pistons 39. As best shown in Fig. 6, when pistons 39 are extended, fingers 34 will be rocked inwardly to grip the peripheral outer flange 40 of a mold flask 41. If piston 15 is then caused to move upwardly, such flask will be elevated and may be swung to one side to the extent permitted by stop 24. An eccentric cam lock 42 is provided in draw head 18 to permit the latter to be locked to piston 15 by means of handle 43 when desired.

Referring now more particularly to Figs. 1 and 4, a pair of rigid arms 44 and 45 depend from collar 12 carried by the upper end of outer piston 8. To the lower ends of such arms are secured outwardly extending stub shafts 46 and 47 having forwardly extending arms 48 and 49 secured thereto. Such stub shafts are provided with keyways locking arms 48 and 49 against rotation relative thereto but permitting such latter arms to be adjustably positioned therealong. Arms 48 and 49 respectively terminate in cradles 50 and 51 adapted to engage split trunnions on the ends of the mold flasks in the general manner described in Oyster Patent No. 2,012,478. It will accordingly be apparent that, when outer piston 3 is caused to rise, such cradles when properly positioned will engage the trunnions on the mold flasks to elevate such flasks and permit the operator to roll the same over.

The operation of my new machine may be briefly described as follows. The assembled flasks with the matchplate pattern therebetween are placed upon the jolt table 4 with the cope side down and the drag side up. The operator then fills the drag with molding sand and jolt rams the same in conventional manner. After ramming, a bottom board is placed upon the drag and clamped to the flask. Fluid pressure is now admitted to the lower end of cylinder 7 to raise outer piston 8, causing cradles 50 and 51 to engage the trunnions of the flask assembly to elevate the latter above the jolt table. (This of course incidentally raises inner piston 15 therewith carrying draw head 18 which, however, performs no function at this time. Such draw head will have been swung to one side out of the way against stop 24.) The operator rolls over the flask assembly in the cradles so that the drag is now below and the cope above. Upon relieving the pressure in cylinder 7, piston 8 descends, again depositing the flask assembly on table 4. It will be noted as shown in Fig. 3 that the lifting cradles normally lie just below the level of such table.

The operator next fills the cope and preferably hand rams the same rather than jolting by means of the jolt table if the mold is at all deep since such further jolting might damage the drag mold already formed. A little light jolting at this stage is, however, sometimes permissible. The sprue will ordinarily be cut in the cope mold at this time.

The operator now swings the draw head 18 to bring the clamping mechanism over the mold assembly and actuates cylinders 37 to cause fingers 34 to clamp the cope. Bar 28 will, of course, have been previously adjusted so that fingers 34 will clear the upper edge of the cope flask 41 when pistons 39 are fully retracted but will engage peripheral flange 40 when such pistons are extended after swinging the draw head into position. Fluid pressure is admitted to the interior of inner piston 15 through inlet opening 52 in plug 17 and thence through passage 53 in piston head 16 to cause such piston to rise carrying the draw head and cope with it and stripping the cope from the pattern. The lower end of piston head 16 is, of course, of greater area than the inner cross-section of tubular piston 15 so that the resultant pressure differential serves to raise such piston. Head 18 may be locked against pivotal movement during the draw by means of lock 42, this sometimes being desirable in the case of a deep draw. Head 18 and the cope supported thereby are then swung to one side. Piston 8, of course, remains in lowered position.

The pattern is drawn from the drag by hand with the pattern plate being guided by the usual pins and bushings. When the pattern has been removed, the cope is swung back over the drag and lowered to close the mold. Cylinders 37 are actuated to cause clamping fingers 34 to release their hold on the cope and the draw head is again swung aside.

The bottom board is unclamped and the usual sand strips which help to hold the mold in the flask are removed, permitting the flask to be stripped from the assembled mold. The finished mold is now carried out on the bottom board and placed on a conveyor or set upon the floor where it will be poured. The usual jacket will, of course, be placed upon the mold prior to the pouring operation.

It will be seen from the foregoing that I have provided a novel form of molding machine permitting an operator to handle large molds in an expeditious manner and without the great physical strain usually imposed upon him. The front of the molding machine is left clear and unencumbered so that there is a minimum of interference with the handling of the mold flasks. Since the cope is drawn upwardly by means of draw head 18 instead of drawing the mold downwardly by lowering of the supporting table, additional special controls for such table are not required.

Flasks of the type most suitable for use with my new machine are commercially available and have a shallow relief pattern on their interior surfaces to assist in holding the mold. They may be partially opened at opposite corners to facilitate stripping from the finished mold. Half trunnions are carried by the ends of each flask as shown in the Oyster patent adapted to meet corresponding half trunnions of the other flask when assembled.

By employing clamping fingers 34 having arcuately curved inner faces which may desirably be slightly serrated, the clamping of flange 40 is assured so that the draw will be perfectly vertical. Otherwise, if the cope should be slightly tilted, one finger may hook and lift one side of the flask before the other finger becomes engaged, thereby accentuating the tilt and damaging the mold. Since each clamping finger is actuated from a single fluid pressupre source but by different piston cylinder assemblies it is not absolutely essential that the clamping head be perfectly centered over the cope flask. If one finger engages the flask prior to the other finger due to such slight lateral displacement, the latter finger will continue to swing inwardly until engaged.

without such first finger pushing the flask to one side.

The manual controls (not shown) for the valve admitting fluid pressure to raise piston 15 and the valve for actuation of the clamping cylinders 37 will conveniently be located on bracket 31 of the clamping head, and the usual knee valve may be provided for operation of the jolt table. Compressed air will commonly be employed as the fluid pressure means but hydraulic fluids such as oil may be used.

Not only does axial alignment of cylinder 7, piston 8, and piston 15 one within the other conserve space and make for efficient operation but also such arrangement permits the draw head to be automatically elevated whenever the trunnion cradles are raised. There is consequently no danger of accidental jamming if such head has not been swung sufficiently to one side. Time is saved by having the draw head always adjusted at the exact height for clamping the cope and starting the draw. The provision of a single lifting means ensures that both trunnion cradles 50, 51 will be raised in unison.

Reference may also be had to my co-pending application Serial No. 104,769, filed July 14, 1949, now Patent No. 2,623,252, for a detailed description of certain features such as the cope clamping means which may advantageously be employed in conjunction with the present invention.

Other modes of applying the principle of the invention may be employed, change being made as regards the details described, provided the features stated in any of the following claims or the equivalent of such be employed.

I therefore particularly point out and distinctly claim as my invention:

1. In a jolt type molding machine having a jolt table on which a mold flask is adapted to rest, a vertically disposed fluid-pressure piston-cylinder assembly with the upper end of such piston extending from the upper end of such cylinder, a depending bar rigidly secured to such end of such piston, guide means engaging said bar adapted to prevent rotation of such piston in such cylinder in both extended and retracted position, a pair of downwardly extending lateral arms rigidly secured to such upper end of such piston, laterally extending stub shafts carried by the respective lower ends of said arms, forwardly extending arms keyed to said respective shafts for adjustable positioning therealong, said forwardly extending arms normally lying at a level below the level of said table and to either side thereof respectively when such piston is in retracted position, aligned trunnion cradles carried by the ends of said forwardly extending arms adapted when raised to engage corresponding trunnions of a mold flask assembly on such table, a second vertical cylinder within such first piston, a second piston within said second cylinder having its upper end extending from said second cylinder, a piston head on the lower end of said second piston, a passage leading from the upper end of said second piston and through said piston head for admission of fluid pressure to said second cylinder, a depending bar rigidly secured to the upper end of said second piston, guide means engaging said latter bar adapted to prevent rotation of said second piston within said second cylinder in either extended or retracted position, a draw head pivotally mounted on the upper end portion of said second piston for swinging movement in a horizontal plane, into and out of position directly above such jolt table, stop means limiting the degree of such swinging movement, locking means operative to lock said head in selected rotative position, a pair of spaced opposed clamping fingers pivotally mounted on said head and adapted to engage and cooperatively grip a mold flask therebetween, and separate fluid-pressure piston-cylinder assemblies operative to rock said fingers into and out of clamping position.

2. In a jolt type molding machine having a jolt table on which a mold flask is adapted to rest, a vertically disposed fluid-pressure piston-cylinder assembly with the upper end of such piston extending from the upper end of such cylinder, guide means adapted to prevent rotation of such piston in such cylinder in both extended and retracted position, a pair of downwardly extending lateral arms rigidly secured to such upper end of such piston, forwardly extending arms rigidly secured to the lower ends of said downwardly extending arms, said forwardly extending arms normally lying at a level below the level of said table and to either side thereof respectively when such piston is in retracted position, aligned trunnion cradles carried by said forwardly extending arms adapted when raised to engage corresponding trunnions of a mold flask assembly on such table, a second vertical fluid-pressure cylinder within such first piston, a second piston within said second cylinder having its upper end extending from said second cylinder, guide means adapted to prevent rotation of said second piston within said second cylinder in both extended and retracted position, a draw head pivotally mounted on the upper end portion of said second piston for swinging movement in a horizontal plane, into and out of position directly above such jolt table, stop means limiting the degree of such swinging movement, locking means operative to lock said head in selected rotative position, a pair of spaced opposed clamping fingers pivotally mounted on said head and adapted to engage and cooperatively grip a mold flask therebetween, and separate fluid-pressure piston-cylinder assemblies operative to rock said fingers into and out of clamping position.

3. In a jolt type molding machine having a jolt table on which a mold flask is adapted to rest, a vertically disposed fluid-pressure piston-cylinder assembly with the upper end portion of such piston extending from the upper end of such cylinder, means adapted to prevent rotation of such piston in such cylinder, a pair of arms carried by such upper end portion of such piston extending forwardly to either side of such jolt table at a level below the level of such table and to either side thereof respectively when such piston is in retracted position, aligned trunnion cradles carried by said forwardly extending arms adapted when raised to engage corresponding trunnions of a mold flask assembly on such table, a second vertical fluid-pressure cylinder within such first piston, a second piston within said second cylinder having its upper end extending from said second cylinder, means adapted to prevent rotation of said second piston within said second cylinder, a draw head pivotally mounted on the upper end portion of said second piston for swinging movement in a horizontal plane, into and out of position directly above such jolt table, and mold flask clamping means carried by said draw head.

4. In a molding machine having a table on which a mold flask assembly is adapted to rest, a vertically disposed fluid-pressure piston-cylinder assembly adjacent thereto with the upper end portion of such piston extending from the upper end of such cylinder, a pair of arms carried by such upper end of such piston and extending forwardly therefrom, aligned trunnion cradles carried by said forwardly extending arms adapted when raised to engage corresponding trunnions on such mold flask assembly to lift the latter from such table, a second vertical fluid-pressure cylinder within such first piston, a second piston within said second cylinder, a draw head mounted on said second piston for swinging movement in a horizontal plane, into and out of position directly above such jolt table, and mold flask clamping means carried by said draw head.

5. In a molding machine having a table on which a mold flask assembly is adapted to rest, a vertically disposed fluid-pressure piston-cylinder assembly, adjacent thereto, a pair of forwardly extending arms mounted to be raised by actuation of said piston-cylinder assembly, horizontally aligned trunnion cradles carried by said arms adapted when raised to engage corresponding trunnions on such mold flask assembly to lift the latter from such table, a second fluid-pressure piston-cylinder assembly vertically aligned with and carried by said first piston-cylinder assembly above such table, and a draw head supported by said second piston-cylinder assembly and adapted to be raised by such assembly, said draw head being provided with mold flask clamping means.

6. In a molding machine, a vertically disposed fluid-pressure piston-cylinder assembly, means carried by said assembly adapted to engage and lift a mold flask when said assembly is actuated, a second fluid-pressure piston-cylinder assembly carried by said first assembly and therefore raised and lowered together with said lifting means, and a draw head carried by said second assembly adapted to be raised and lowered thereby relative to said first assembly.

7. In a molding machine, trunnion cradles adapted to engage corresponding trunnions of a mold flask assembly and lift the same to facilitate the rolling over of such assembly, means operative to raise and lower said cradles, a draw head above said cradles adapted to engage and hold the uppermost flask of such assembly, means mounting said draw head for vertical movement together with said cradles, and means operative to raise and lower said draw head relative to said cradles.

8. In a portable jolt molding machine having a base, rollers supporting such base for movement along the molding floor, and a jolt table carried by such base adapted removably to support a separate cope and drag mold flask assembly thereon with a double-sided pattern interposed therebetween; a pair of horizontally aligned upwardly open trunnion cradles supported by such base for up and down movement to engage corresponding trunnions on such flask assembly and pick up and lift the latter above such jolt table into position where such flask assembly can then be rolled over and lowered to rest again upon such table, power means operative thus to raise and lower said cradles in unison, a draw head carried by such base and mounted for vertical reciprocation above such jolt table and such flask assembly thereon, power-operated clamping means on said head operative actively to grip an uppermost flask of such assembly when the latter is resting on such table, lifting means operative to lift said head independently of said cradles to draw such uppermost flask and mold section from such pattern with the lower flask and the pattern still supported on such table, means mounting said head for lateral swinging movement, and means adapted to enforce straight-line, non-swinging movement of said head during such drawing operation.

9. In a jolt molding machine having a base and a jolt table carried by such base adapted removably to support a separate cope and drag mold flask assembly having a double-sided pattern interposed therebetween; a pair of horizontally aligned upwardly open trunnion cradles supported by such base for up and down movement to engage corresponding trunnions on such flask assembly and pick up and lift the latter above such jolt table into position where such flask assembly can then be rolled over and lowered to rest again upon such table, power means operative thus to raise and lower said cradles in unison, a draw head carried by such base and mounted for vertical reciprocation above such jolt table and such flask assembly thereon independently of said cradles, active clamping means on said head operative to grip an uppermost flask of such assembly in definite horizontal position when the latter is resting on such table, lifting means operative to lift said head relative to such table and cradles to draw such uppermost flask and mold section from such pattern with the lower flask and the pattern remaining supported on such table, said head being mounted for lateral swinging movement about a vertical axis, and means adapted to enforce straight-line, non-turning movement of said head during such drawing operation.

References Cited in the file of this patent

UNITED STATES PATENTS

| Number | Name | Date |
|---|---|---|
| 778,329 | Pipher | Dec. 27, 1904 |
| 1,059,250 | Wilcoxen | Apr. 15, 1913 |
| 1,545,420 | Frazer | July 7, 1925 |
| 1,782,762 | Morris et al. | Nov. 25, 1930 |
| 2,012,478 | Oyster | Aug. 27, 1935 |
| 2,142,491 | Byerlein | Jan. 3, 1939 |

FOREIGN PATENTS

| Number | Country | Date |
|---|---|---|
| 23,575 | Great Britain | Oct. 25, 1911 |